UNITED STATES PATENT OFFICE.

BEVERLEY HARRIS, OF NEW ORLEANS, LOUISIANA.

IMPROVEMENT IN APPLICATIONS FOR RESTORING THE HAIR.

Specification forming part of Letters Patent No. 23,086, dated March 1, 1859.

*To all whom it may concern:*

Be it known that I, BEVERLEY HARRIS, of the city of New Orleans, parish of Orleans, State of Louisiana, have made a new and useful Improvement in Hair-Tonics; and I hereby declare that the following is a full, clear, and exact description thereof with the ingredients used and the manner of producing the composition.

The ingredients are as follows in proportions as stated: one-half gallon of cold-pressed castor-oil; one quart of bay-rum; one quart of alcohol; eight grains of quinine; two ounces of bitter-apple; four ounces of fine gunpowder. Mix the castor-oil and the quinine together, and take as much of this mixture and mix with the gunpowder, which will be required to make the consistency of paste when worked well together. Put the bitter-apple in the alcohol and let it remain about ten minutes; then strain through a woolen cloth to separate the liquid from the solid; then mix the whole of the ingredients well together; allow the same to stand about six hours; then strain to obtain the pure liquid, the part composing the tonic for the hair. The bitter-apple and the gunpowder opens the pores of the skin and invigorates the roots of the hair.

I do not claim the use of castor-oil, bay-rum, alcohol, or quinine for hair-tonics, as I am aware these ingredients have heretofore been used for this purpose.

After this my description, what I claim as new, and desire to secure by Letters Patent, is—

The use of bitter-apple and gunpowder in combination with the before-stated ingredients, when used in substantially the same proportion as set forth and for the purpose of hair-tonics, as herein described.

BEVERLEY HARRIS.

Witnesses:
FRANCIS ARMSTRONG,
HENRY G. MOSES.